(12) United States Patent
Knobel

(10) Patent No.: US 6,268,006 B1
(45) Date of Patent: Jul. 31, 2001

(54) METHOD FOR PRODUCING CONSUMABLE ITEMS

(75) Inventor: Josef Knobel, Wigoltingen (CH)

(73) Assignee: KMB Produktions, Felben (CH)

(*) Notice: Subject to any disclaimer, the term of this patent is extended or adjusted under 35 U.S.C. 154(b) by 0 days.

(21) Appl. No.: 09/423,856
(22) PCT Filed: Apr. 11, 1998
(86) PCT No.: PCT/EP98/02122
§ 371 Date: Nov. 15, 1999
§ 102(e) Date: Nov. 15, 1999
(87) PCT Pub. No.: WO98/52425
PCT Pub. Date: Nov. 26, 1998

(30) Foreign Application Priority Data

May 17, 1997 (DE) ............................................... 197 20 844
Jul. 25, 1997 (DE) ............................................... 197 32 036

(51) Int. Cl.[7] ........................................................ A23G 7/00
(52) U.S. Cl. ............................................ 426/515; 426/660
(58) Field of Search ................................... 426/515, 512, 426/524, 660; 249/135

(56) References Cited

U.S. PATENT DOCUMENTS 4,421,773 * 12/1983 Akutagawa .......................... 426/512
5,409,722 * 4/1995 Binley .................................. 426/515

FOREIGN PATENT DOCUMENTS

207974 * 12/1923 (GB) .
616053 * 7/1978 (SU) ..................................... 249/135

* cited by examiner

Primary Examiner—George C. Yeung
(74) Attorney, Agent, or Firm—Bachman & LaPointe, P.C.

(57) ABSTRACT

The invention relates to a method for the production of consumable items having an outer jacket made from a flowable mass, which is filled in a mold. A tempered die (5) is immersed into the mold (9) and the mass is extruded. The dew point of the atmosphere around the consumable item is kept below the temperature of the die (5).

8 Claims, 2 Drawing Sheets

METHOD FOR PRODUCING CONSUMABLE ITEMS

BACKGROUND OF THE INVENTION

The present invention relates to a method for the production of comestibles having an outer husk composed of a flowable mass which is introduced into a mold, a thermally controlled ram penetrating into the mold and extruding the mass.

In a whole range of comestibles, it is necessary to produce an outer husk composed of a flowable mass, this flowable mass being pressed into a cavity, solidifying there as a result of appropriate thermal control and thus assuming a solid form. This applies, for example, to dog food, when an outer fatty husk encasing a meat mixture or the like is produced. In this case, heated flowable fat is introduced into a mold and is given a husk-like form by means of a pressure ram, the ram being cooled and the fat-like husk solidifying during the molding operation.

Primarily, and the present invention is to refer particularly to this, this operation relates to the production of a chocolate husk which is subsequently filled with a filling. For example, it is known from GB Patent 207 974 to introduce a ram, through which a coolant flows, into the chocolate mass, penetration taking place to an extent such that the chocolate husk obtained acquires the desired thickness. So that the ram can be separated from the chocolate mass again, the ram is provided with a corresponding separating agent, so that the chocolate mass does not remain adhering to the surface of the ram.

Furthermore, it is known from Utility Model 93 21 186 that the ram or the projections or cooling bodies on the ram are cooled to a temperature below 0° C. and then penetrate into the chocolate mass. Cooling gives rise, on the surface of the ram, to an extremely thin ice layer, since the dewpoint of the ambient air is above the die temperature separating the ram from the chocolate mass. As a result of the thin ice layer, however, stains may form on the inside of the comestible, this again being undesirable.

The same also applies to the proposal according to EP 0 715 813, whereby the ram element is cooled at least to a temperature such as to reach or fall below the dewpoint of the atmosphere surrounding the chocolate mass. In this case, too, that surface of the ram element which faces the chocolate mass becomes fogged before contact with the chocolate mass.

The object on which the present invention is to provide a method of the above-mentioned type, in which these disadvantages and, in particular, the formation of stains do not occur.

SUMMARY OF THE INVENTION

The foregoing object is achieved by providing a method wherein the dewpoint of the atmosphere surrounding the comestible is maintained below the temperature of the ram.

This method according to the invention avoids fogging of the ram or of the ram surfaces facing the chocolate mass, so that there is no formation of stains. In practice, however, it has become clear that the ram is nevertheless released very easily from the chocolate mass, since the operation is carried out at relatively low temperatures. There is, however, neither the formation of ice nor the formation of condensation water on the die.

Another feature of the present invention, for which independent protection is also requested, relates to the fact that the mold is vibrated during or after, preferably immediately after the introduction of the mass. Preferably, vibration takes place uniformly and prior to the penetration of the ram. The particular advantage of the invention is that, as a result of the vibration, a uniform distribution of the mass forming the outer husk occurs, so that a mirrorsmooth surface is obtained here.

The method can be carried out particularly effectively if the ram and/or the mold is/are produced from material having very high thermal conductivity. In this case, above all, copper, which possesses high thermal conductivity, is appropriate. The method is improved even further if the basic body of the ram and/or mold consists of copper and the surfaces coming into contact with the mass of the comestible are coated with silver or a silver alloy. Silver has an even higher thermal conductivity than copper, so that, ultimately, the thermal conductivity on the surface of the ram is between those of copper and silver. Silver also has the advantage that the mass of the comestible does not remain adhering. Separate protection is also requested for these features.

So that the entire method can be carried out continuously, the ram and mold are to be moved jointly during the thermal control and extrusion operation. In this case, it is necessary for the mold and ram to be centered relative to one another, for which reason corresponding centering pins are provided which engage into corresponding centering bores.

It was found, moreover, that the mold, which may consist, for example, of plastic, tends to become distorted after being used several times. Consequently, according to the invention, preferably resilient pressure pins are to be provided on the ram, which, when the die is being closed, press onto the mold and compensate these unevennesses.

Although the present invention is particularly well suited to the production of chocolate husks, it is not to be restricted to this, since other comestibles can also be produced very advantageously by means of this method.

BRIEF DESCRIPTION OF THE DRAWINGS

Further advantages, features and details of the invention may be gathered from the following description of preferred exemplary embodiments and with reference to the drawing, in which.

DETAILED DESCRIPTION

Figure 2:
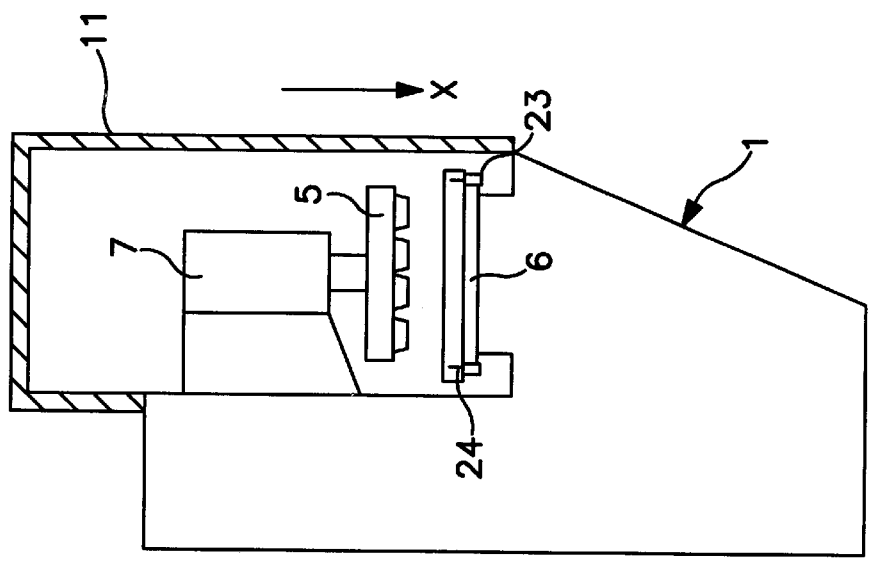
FIG. 2 shows a side view of the apparatus according to FIG. 1.
Figure 1:
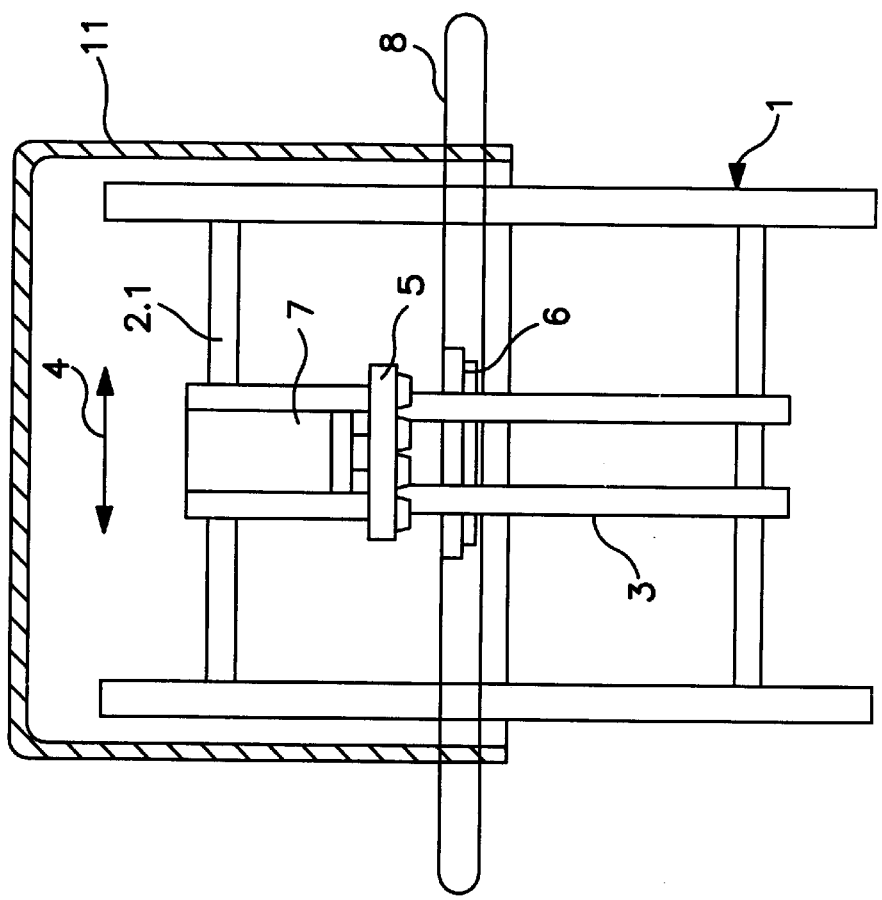
FIG. 1 shows a diagrammatically illustrated front view of an apparatus for the production of comestibles.

According to FIG. 1, an apparatus according to the invention for the production of comestibles has a machine frame 1, in which two horizontal guide columns 2.1 and 2.2 are located. A slide 3 is guided on these guide columns 2.1 and 2.2 in the direction of the double arrow 4, this slide 3 guiding a ram 5 and a table 6 likewise in the direction of the double arrow 4. The ram 5 is arranged on a lifting device 7 and can be moved in the lifting direction x (see FIG. 2).

Figure 3:
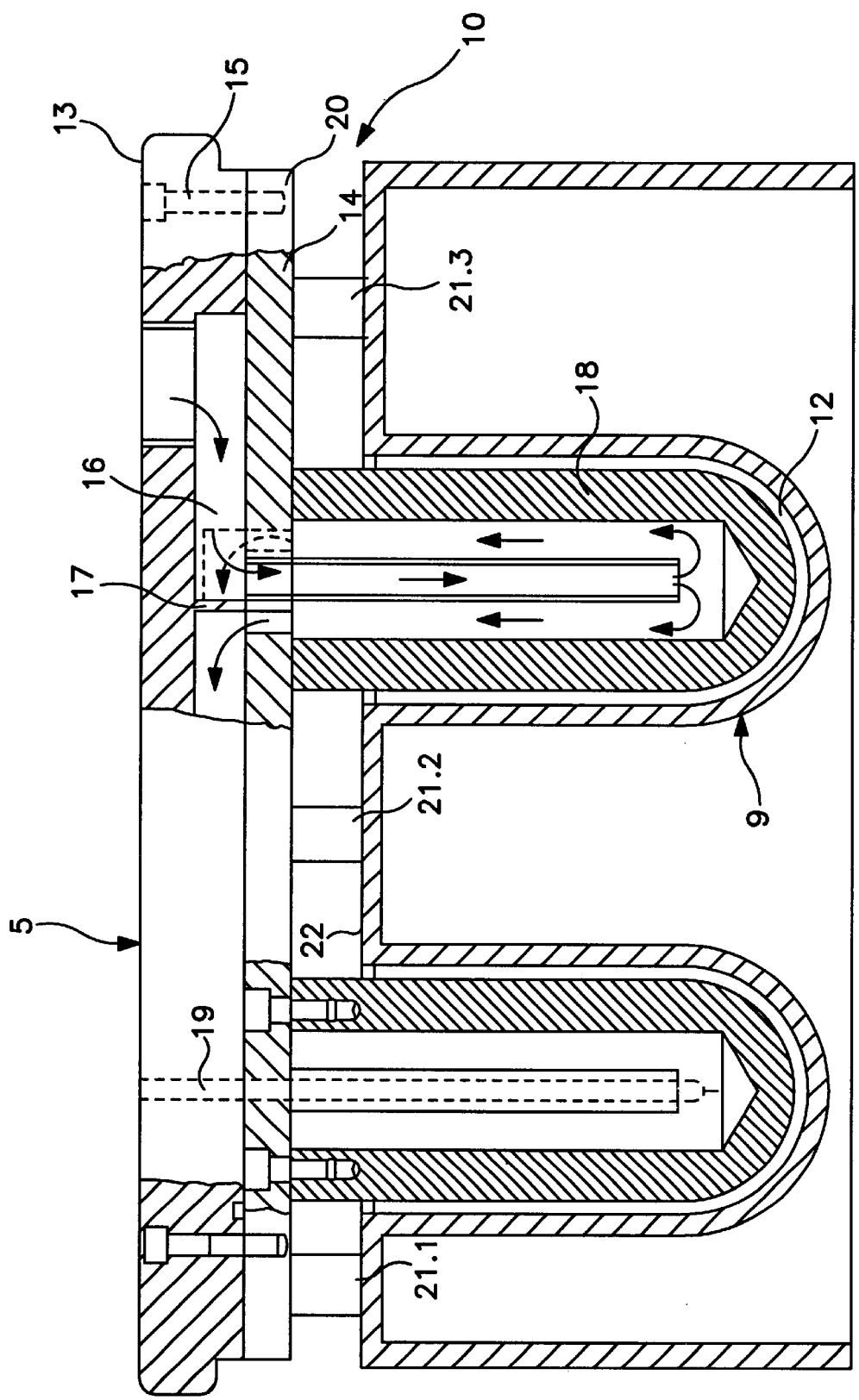
FIG. 3 shows a cross section through a die according to the invention for the production of comestibles.

Over the table 6 runs an endless band 8, onto which a mold 9 shown in FIG. 3 can be laid. The mold 9 forms, together with the ram 5, a die 10 for the production of comestibles. This die 10 and a large part of the slide 3 are located within a closed housing 11 defining a space having an atmosphere.

According to FIG. 3, the mold 9 has cavities 12 which, in the position of use, are filled with a mass for producing the comestible. The cavity 12 accordingly also has a shape which corresponds to the desired outer shape of the comestible.

The ram 5 has two plates 13 and 14 which are connected to one another via screws 15. Ducts 16 and a web 17, which serve for guiding a cooling medium, are worked into both plates 13 and 14. Furthermore, projections 18 are fixed to the plate 14 and cooperate with the cavities 12 for producing the comestible. The cooling medium is also guided in these projections 18. Moreover, broken lines indicate a temperature sensor 19, by means of which the temperature of the ram 5 and, in particular, of the projections 18 can be determined.

Pressure pins 21.1 and 21.2 also project from a lower surface 20 of the plate 14 and, when the die 10 is in the closed position, press onto a surface 22 of the mold 9. Consequently, the mold 9 is pressed onto the endless band 8 and distortions of said mold are compensated.

The present invention functions as follows:

A mold 9 is laid onto the endless band 8, for example on the left side in FIG. 1. A chain 23, on which feed pins 24 are provided, preferably runs next to the endless band 8. These feed pins 24 project beyond the endless band 8 and take up the mold 9.

The slide 3 is located as far as possible to the left in FIG. 1. As soon as the mold 9 has arrived on the table 6, the ram 5 is lowered by means of the lifting device 7 and the projections 18 engage into the cavities 12, the mass of the comestible being distributed in the remaining cavity. The pressure pins 21.1 and 21.2 simultaneously press onto the mold 9, so that possible distortions of the latter are compensated.

The slide 7 then moves together with the endless band 8, and at the same time the comestible is thermally controlled in the desired way.

As soon as the slide 7 has arrived on the right side in FIG. 1, the ram 5 is raised and the mold 9 is released and can then run out of the housing 11.

What is claimed is:

1. A method for the production of comestibles having an outer husk composed of a flowable mass which is introduced into a mold, a thermally controlled ram penetrating into the mold extruding the mass, and a closed housing defining a space having an atmosphere surrounding the comestible, the method comprises maintaining the dewpoint of the atmosphere below the temperature of the ram.

2. The method as claimed in claim 1 including vibrating the mold prior to the penetration of the ram.

3. A method as claimed in claim 1 including forming a portion of at least one of the ram and the mold of a material selected from the group consisting of copper, silver, copper alloy and silver alloy.

4. A method as claimed in claim 3 wherein the portion comprises those surfaces of the ram which come into contact with the outer husk.

5. The method as claimed in claim 4 wherein the material consists of silver or silver alloy.

6. The method as claimed in claim 5 wherein the forming step comprises applying a coating by electro-deposition.

7. The method as claimed in claim 1 including moving jointly the ram and the mold during extruding.

8. The method as claimed in claim 1 wherein the mold and ram are centered relative to one another.

\* \* \* \* \*